US 6,685,167 B2

(12) United States Patent
Robison et al.

(10) Patent No.: US 6,685,167 B2
(45) Date of Patent: Feb. 3, 2004

(54) DOUBLE-SEATED SHUTOFF VALVE

(75) Inventors: Jeffrey C. Robison, Provo, UT (US); Stephen R. Chipman, Provo, UT (US); Michael R. Luque, Orem, UT (US); Craig C. Smith, Provo, UT (US)

(73) Assignee: Caldera Engineering LC, Provo, UT (US)

( * ) Notice: Subject to any disclaimer, the term of this patent is extended or adjusted under 35 U.S.C. 154(b) by 0 days.

(21) Appl. No.: 09/829,583

(22) Filed: Apr. 9, 2001

(65) Prior Publication Data

US 2002/0030173 A1 Mar. 14, 2002

Related U.S. Application Data

(60) Provisional application No. 60/196,418, filed on Apr. 11, 2000.

(51) Int. Cl.[7] .................................................. F16K 31/00
(52) U.S. Cl. ........................................ 251/368; 251/210
(58) Field of Search ................................... 251/210, 368

(56) References Cited

U.S. PATENT DOCUMENTS

| 3,648,718 A | * | 3/1972 | Curran ........................ 137/269 |
| 4,728,078 A | * | 3/1988 | Oda et al. ................. 123/188.8 |
| 4,850,392 A | * | 7/1989 | Crump et al. ................ 137/469 |
| 5,562,117 A | * | 10/1996 | Borland et al. .............. 137/613 |
| 5,707,041 A | * | 1/1998 | Bovee et al. ................ 251/298 |

* cited by examiner

Primary Examiner—Kevin Shaver
Assistant Examiner—David A. Bonderer
(74) Attorney, Agent, or Firm—Lloyd W. Sadler

(57) ABSTRACT

A new valve device adapted specifically for use with hot erosive flow streams is provided. This valve device has an inner plug head, which modulates and throttles the amount of flow passing through the valve when the valve is open. The inner plug head is shaped so that as the valve plug approaches the closed position, the inner plug head blocks most of the flow path, reducing the flow to a small amount. The valve of this invention has an outer plug head the contacts the valve's outer ceramic seat as the valve reaches the closed position. Contact between the outer ceramic seat and the outer ceramic plug entirely shuts off flow through the valve.

6 Claims, 1 Drawing Sheet

DOUBLE-SEATED SHUTOFF VALVE

CROSS REFERENCE TO RELATED APPLICATIONS

This application is based on U.S. Provisional Application Ser. No. 60/196,418, which was filed on Apr. 11, 2000, and priority is claimed thereto.

BACKGROUND OF INVENTION

1. Field of the Invention

This invention relates to valve devices for controlling a flow stream. More specifically, this invention relates to valves with ceramic plug and a ceramic seat, suitable for control of hot, erosive flow streams.

2. Description of Related Art

A variety of valve devices have been used for some time in the control of fluid through a conduit. Typically, these prior devices are either made of non-ceramic materials that tend to wear away quickly in hot, erosive flow streams or, if having a ceramic plug and seat, generally do not permit the ceramic plug and ceramic seat to come in physical contact in order to avoid contact failure, however such prior ceramic plugs and seats are typically unable to entirely shut off the flow, but can only throttle down the flow by narrowing the gap between the plug and the seat.

SUMMARY OF INVENTION

It is desirable to provide a valve with a ceramic plug and a ceramic seat that can shut off the flow through the valve entirely, and that is suitable for controlling the flow of hot, erosive flow streams.

Therefore, it is the general object of this invention to provide a valve device that has ceramic plug and seat components and which is able to shut off the valve entirely.

It is a further object of this invention to provide a valve that has an inner plug head, which modulates and throttles the amount of flow passing through the valve when the valve is open.

It is another object of this invention to provide a valve that has an inner plug head that is shaped in such a manner so that as the valve plug approaches the closed position, the inner plug head blocks most of the flow path, thereby reducing the flow to a small amount.

Another object of this invention is to provide a valve that has an outer plug head that contacts the valve's outer ceramic seat as the valve reaches the closed position.

A further object of this invention is to provide a valve that entirely shuts off flow through the valve as the outer ceramic seat contacts the outer ceramic plug.

These and other objects of this invention are achieved by the device described herein and are readily apparent to those of ordinary skill in the art upon review of this disclosure and/or ordinary experimentation with the device described herein.

Figure 1:
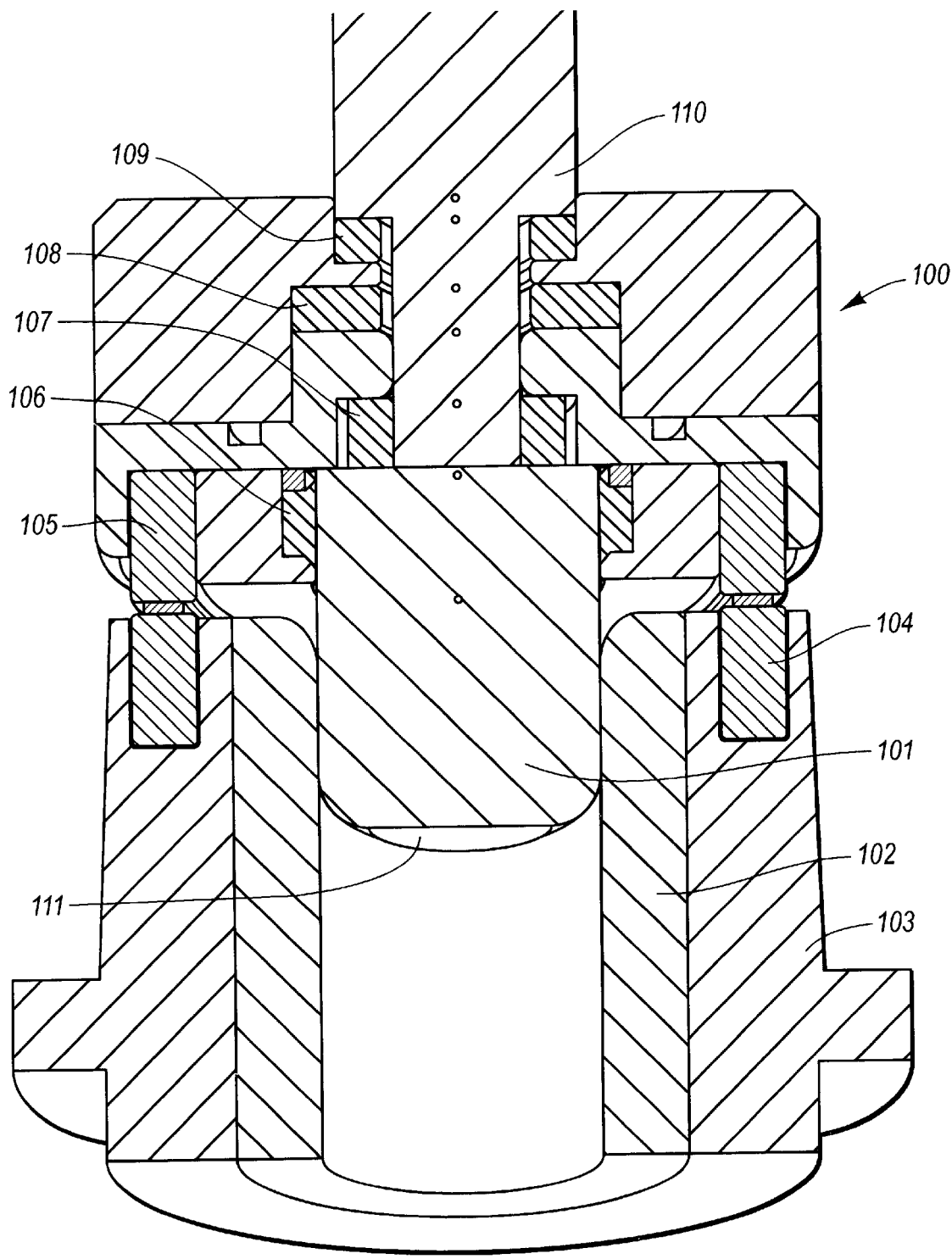
FIG. 1 is a section view of the preferred valve of this invention.

Reference will now be made in detail to the present preferred embodiment of the invention, an example of which is illustrated in the accompanying drawing.

DETAILED DESCRIPTION

Referring now to the figures and particularly to FIG. 1, which is a section view of the preferred embodiment 100 of the valve of this invention. In this embodiment 100 an inner plug head 101, fixed to a plug stem 110, operates within an inner ceramic seat 102. The inner plug head 101, preferably composed of a ceramic material, is shaped, as shown 111, so that the flow is reduced as the valve plug 101 approaches the closed position. The inner ceramic seat 102 is fixed within the valve housing 103. A ceramic outer plug head 105 is provided in the housing 103, which is shown in contact with the outer ceramic seat 104. The preferred outer ceramic plug 105 and the outer seat 104 are disc shaped to improve contact between the outer ceramic plug 105 and the outer ceramic seat 104. Other alternative shapes, although not preferred, can be substituted without departing from the concept of this invention. The outer ceramic plug 105 and the outer seat 104 are placed far enough away from the inner plug head 101 and the inner seat 102 in order that the normal, steady-state flow post the outer plug 105 and the outer seat 104 has a relative low-velocity, while the inner plug 101 and the inner seat 102 interact with a high-velocity flow, since the flow stream is throttled down as it passes between the inner plug head 101 and the inner seat 102 (e.g., the flow control location of the valve). A plug head band 106 is provided to hold the inner plug head 101 in place, thereby reducing the stress in the inner plug head 101. Three compliant rings 107, 108, 109 are provided to support the plug head stem 110. These compliant rings 107, 108, 109 allow the outer plug head 105 to mate evenly with the outer seat 104 without creating large stresses in the outer plug head 105 or the outer seat 104, thereby reducing the propensity of the outer plug head 105 and the outer seat 104 to fracture, break or crack. This inner plug head 101 obstructs most of the flow through the valve as the plug approaches the closed position, thereby permitting a low-velocity flow pass by the outer plug 105 and the outer seat 104 as the valve approaches the closed position. This low velocity flow helps preclude the wear of the outer plug 105 and the outer seat 104.

It is to be understood that the above-described embodiment of the invention is merely illustrative of numerous and varied other embodiments, which may constitute applications of the principles of the invention. Such other embodiments may be readily devised by those skilled in the art without departing from the spirit or scope of this invention and it is our intent that they are deemed as within the scope of our invention.

What is claimed is:

1. A valve apparatus, comprising:
   (A) a housing;
   (B) an inner seat held within said housing;
   (C) an inner plug head operating within said inner seat; said inner plug head fixed to a plug stem;
   (D) an outer plug head within said housing;
   (E) an outer seat within said housing adapted to interact with said outer plug head; and
   (F) and a plug head band, having a first side and a second side, said plug head band being located about said plug stem and about said outer plug; a first compliant ring fixed about said plug stem and between said inner plug head and said first side of said plug head band and a second side of siad plug head band, wherein said complaint rings are affixed about said plug stem to provide support for said plug stem and to facilitate mating of said outer plug head with said outer seat.

2. A valve apparatus, as recited in claim 1, wherein said outer plug and said outer seat are disc shaped.

3. A valve apparatus, as recited in claim 1, wherein said inner plug head is composed of a ceramic material.

4. A valve apparatus, as recited in claim 1, wherein said inner seat is composed of a ceramic material.

5. A valve apparatus, as recited in claim 1, wherein said outer plug head is composed of a ceramic material.

6. A valve apparatus, as recited in claim 1, wherein said outer seat is composed of a ceramic material.

* * * * *